United States Patent
Johnson

(10) Patent No.: US 7,665,409 B2
(45) Date of Patent: Feb. 23, 2010

(54) PLANTER WITH STRUCTURAL AIR MANIFOLD

(75) Inventor: Chad Michael Johnson, Arlington Heights, IL (US)

(73) Assignee: CNH America LLC, New Holland, PA (US)

( * ) Notice: Subject to any disclaimer, the term of this patent is extended or adjusted under 35 U.S.C. 154(b) by 156 days.

(21) Appl. No.: 11/774,301

(22) Filed: Jul. 6, 2007

(65) Prior Publication Data
US 2009/0007828 A1    Jan. 8, 2009

(51) Int. Cl.
*A01C 7/00*    (2006.01)
*A01C 9/00*    (2006.01)
(52) U.S. Cl. ...................................... 111/175
(58) Field of Classification Search ............... 111/174, 111/175, 170, 200, 77; 406/184, 188–191, 406/125, 145; 221/211; 285/140.1, 210, 285/901; 222/563
See application file for complete search history.

(56) References Cited

U.S. PATENT DOCUMENTS

| | | | |
|---|---|---|---|
| 1,302,428 A | 4/1919 | Pereda | |
| 4,142,685 A | 3/1979 | Dreyer et al. | |
| 6,308,646 B1 | 10/2001 | Luxon | |
| 6,644,225 B2 | 11/2003 | Keaton | |
| 6,725,788 B2 | 4/2004 | McCartney et al. | |
| 2005/0034640 A1 | 2/2005 | Quam et al. | |

*Primary Examiner*—Christopher J. Novosad
(74) *Attorney, Agent, or Firm*—Rebecca Henkel

(57) ABSTRACT

A planter, in certain embodiments, includes a structural air manifold. The planter may include a hollow structural member configured to bear and/or distribute static and dynamic loads of the planter. The structural member may include a hollow interior having a first port and a second port. A plurality of individual planting units and a fan may be mounted to the structural member and coupled to the hollow interior at the first and second ports, respectively, via a conduit. The hollow interior may provide a path for forced airflow between the first and second ports to enable pneumatic operation of a feature of the agricultural seed planter. Further, each planting unit may include a seed meter pneumatically coupled to the fan. An orifice may be disposed in the first or second port to restrict the airflow through the port and to the seed meter.

4 Claims, 8 Drawing Sheets

PLANTER WITH STRUCTURAL AIR MANIFOLD

BACKGROUND

The invention relates generally to an agricultural seed planter, such as a multiple row seed planter, used to distribute rows of seeds into soil. For example, the agricultural seed planter may include a number of individual planting units mounted to a common frame, such as a trailer frame or tow frame. A vehicle, such as a tractor, may tow the common frame across an agricultural field, such that the separate individual planting units can plant a plurality of separate rows of seeds into the soil. In some agricultural seed planters, a seed meter regulates the rate of seed distribution in each planting unit.

Typically, a fan provides airflow to drive each individual seed meter through a complex network of conduits separate from the common frame. For example, a separate conduit may connect each seed meter directly with a port of the fan. Unfortunately, these complex networks are expensive and unreliable due to the numerous lengths of conduit, numerous connection points, and extensive space consumption between the fan and each individual seed meter. In addition, the lengthy conduits may interfere with movement of the agricultural seed planter, servicing, maintenance, and so forth.

BRIEF DESCRIPTION

Embodiments of the present invention provide an improved agricultural seed planter and method. The agricultural seed planter may include a hollow structural member configured to provide structural support to the agricultural seed planter. The structural member may include a hollow metal beam configured to bear and/or distribute static and dynamic loads of the agricultural seed planter. The structural member may include a hollow interior having a first port and a second port. A plurality of individual planting units and a fan may be mounted to the structural member and coupled to the hollow interior at the first and second ports, respectively, via a conduit. The hollow interior may provide a path for forced airflow between the first and second ports to enable pneumatic operation of a feature of the agricultural seed planter. Further, each planting unit may include a soil opener, a seeder, a soil closer, a soil packer, and a seed meter, wherein the seed meter is a pneumatically operated feature of the planting unit. Further, an orifice may be disposed in the first or second port to restrict the airflow through the port and to the seed meter.

Certain embodiment of the present invention may include a structural member having a plurality of sections, wherein each section includes a hollow interior having a first port and a second port. Likewise, each hollow interior may be configured to pass a forced airflow between the first and second ports to enable pneumatic operation of a feature of the agricultural seed planter. Additionally, the structural member may include an access port having a removable access panel. Further the structural member may include a plurality of hollow metal beams that are parallel, sequential, or a combination thereof. The beams may be configured to bear and/or distribute static and dynamic loads of the agricultural seed planter. Finally, embodiments of the present invention may include a structural member coupled to a tractor, a trailer, or combination. Additionally the structural member may include a pin connection to enable the structural member to fold from an operating position to a transport position.

DRAWINGS

These and other features, aspects, and advantages of the present invention will become better understood when the following detailed description is read with reference to the accompanying drawings in which like characters represent like parts throughout the drawings, wherein.

Figure 6:
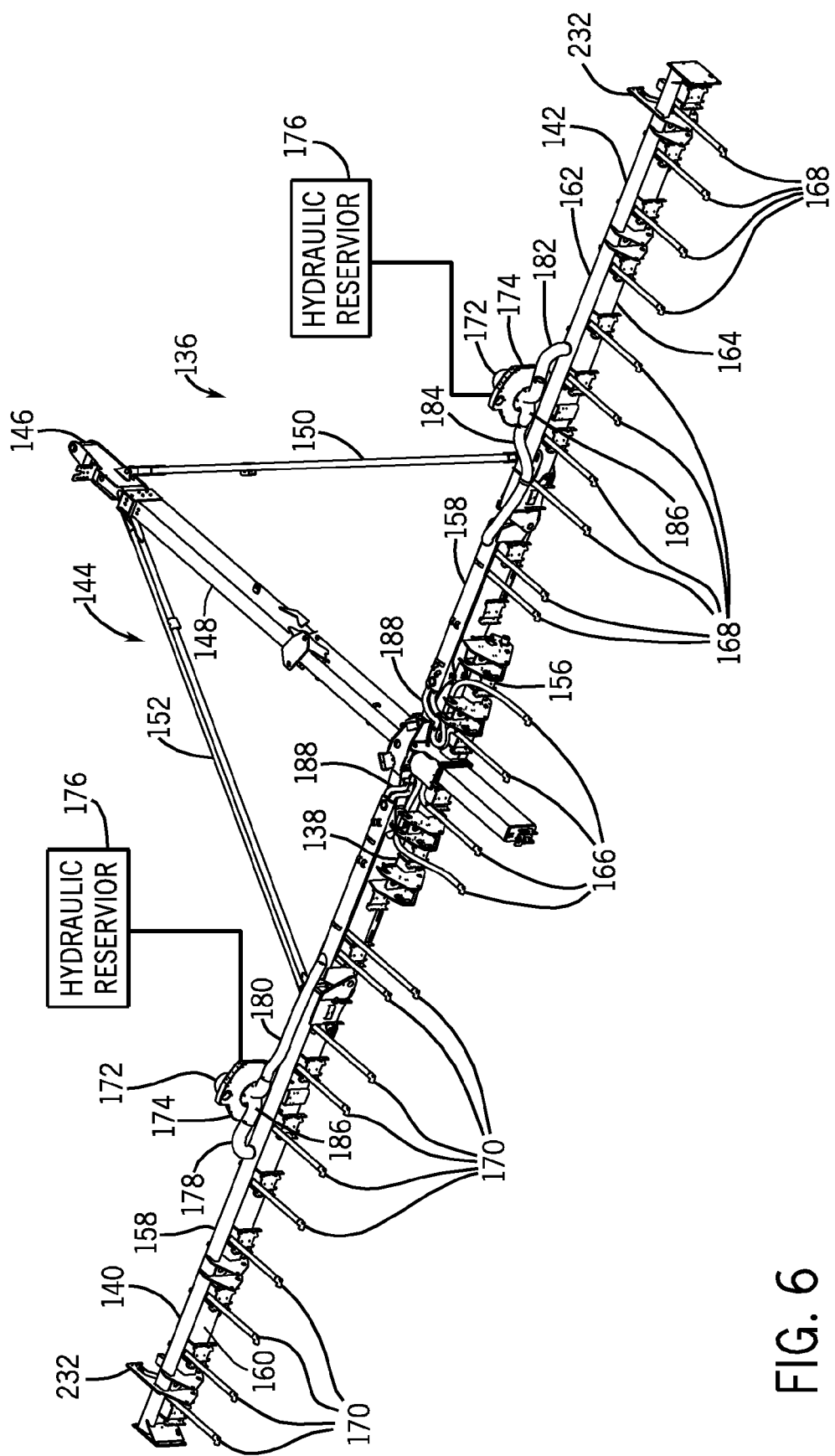
FIG. 6 is a perspective view of a second exemplary agricultural seed planter in accordance with embodiments of the invention, illustrating a second multiple section hollow support frame configured to include a plurality of individual planting units and a tow frame coupled thereto.
Figure 7:
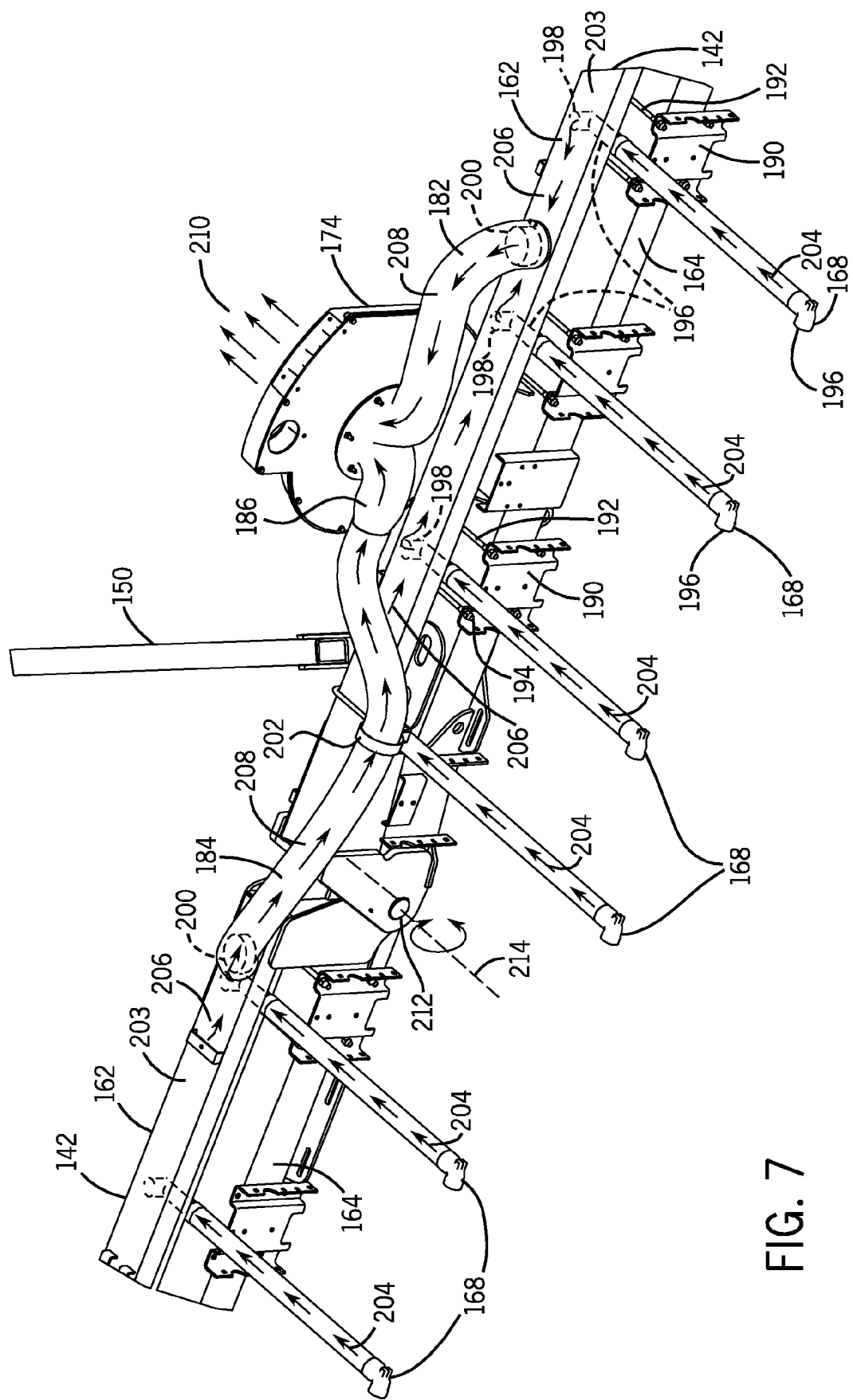
Figure 8:
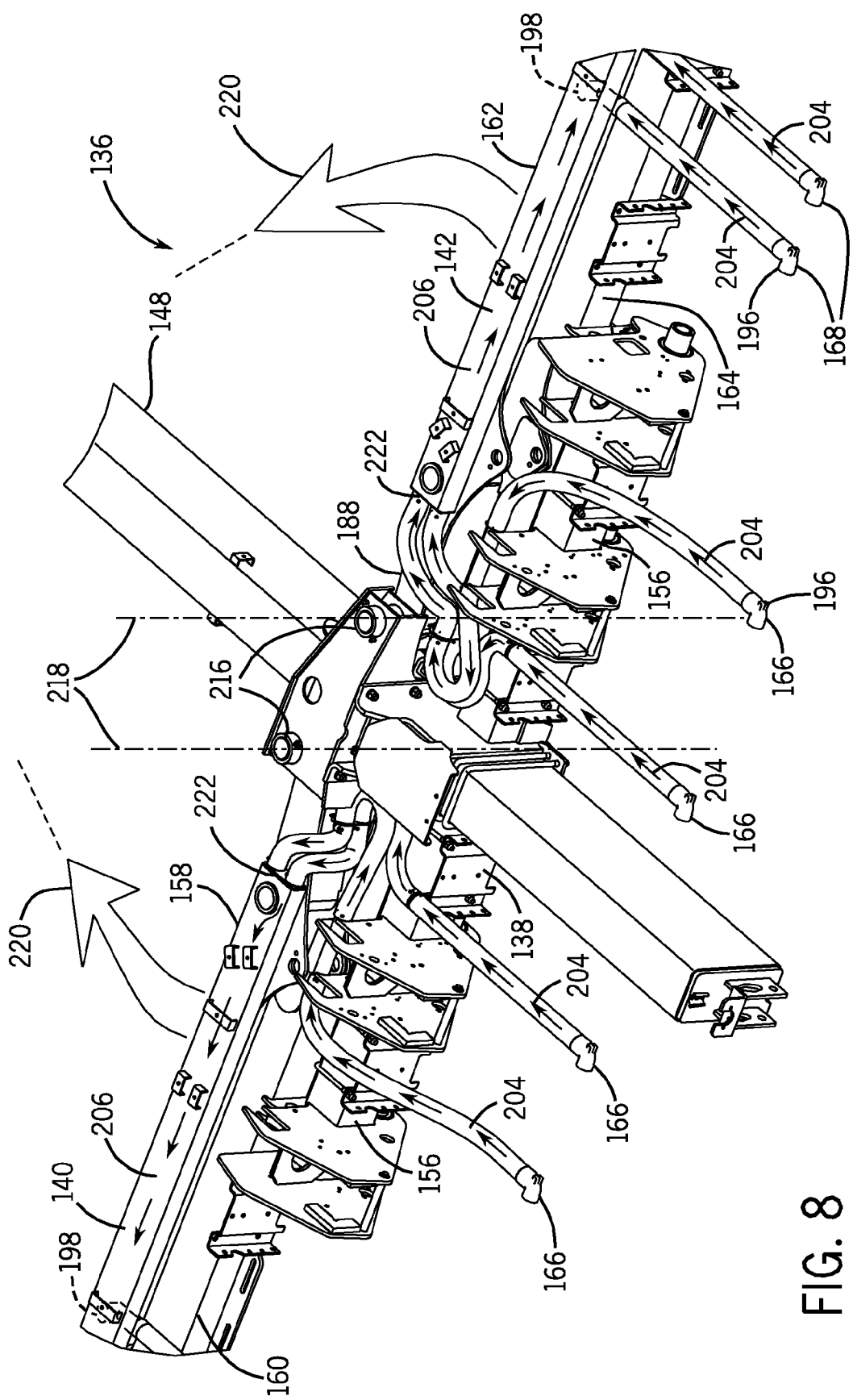

FIG. 7 is a perspective view of an embodiment of the lower right section of the agricultural seed planter of FIG. 6, illustrating a fan and conduit pneumatically coupled to the hollow structural frame to enable one possible air flow path; and FIG. 8 is a perspective view of an embodiment of the middle section of the agricultural seed planter of FIG. 6, illustrating a pivot connection that enables the planter to fold from an operating position to a transport position.

DETAILED DESCRIPTION

Embodiments of the present invention address the problem of complex and costly pneumatic conduit networks used to couple a seed meter to a fan in an agricultural seed planter application. Specifically, embodiments of the present invention enable a hollow support frame of the seed planter to provide both structural support to mount multiple planting units or row units, as well as, serve as an integral manifold for a portion of the air flow circuit between the seed meter and the fan. In other words, the hollow support frame may be used for both its primary function (i.e., to provide structural support) and for a secondary function (i.e., as a portion of the air flow circuit) to provide a number of benefits. Specifically, a separate manifold can be completely eliminated from the agricultural planter of the disclosed embodiments. In other words, the manifold function is built-in or integral with the framework of the agricultural seed planter. This has the benefit of eliminating a number of pneumatic components and reduces the complexity and cost of implementing and maintaining the system. This also has the benefit of enabling more room on the outer surface of the support frame to route other electrical and hydraulic systems, for example, electrical harnesses and hydraulic hoses.

Figure 1:
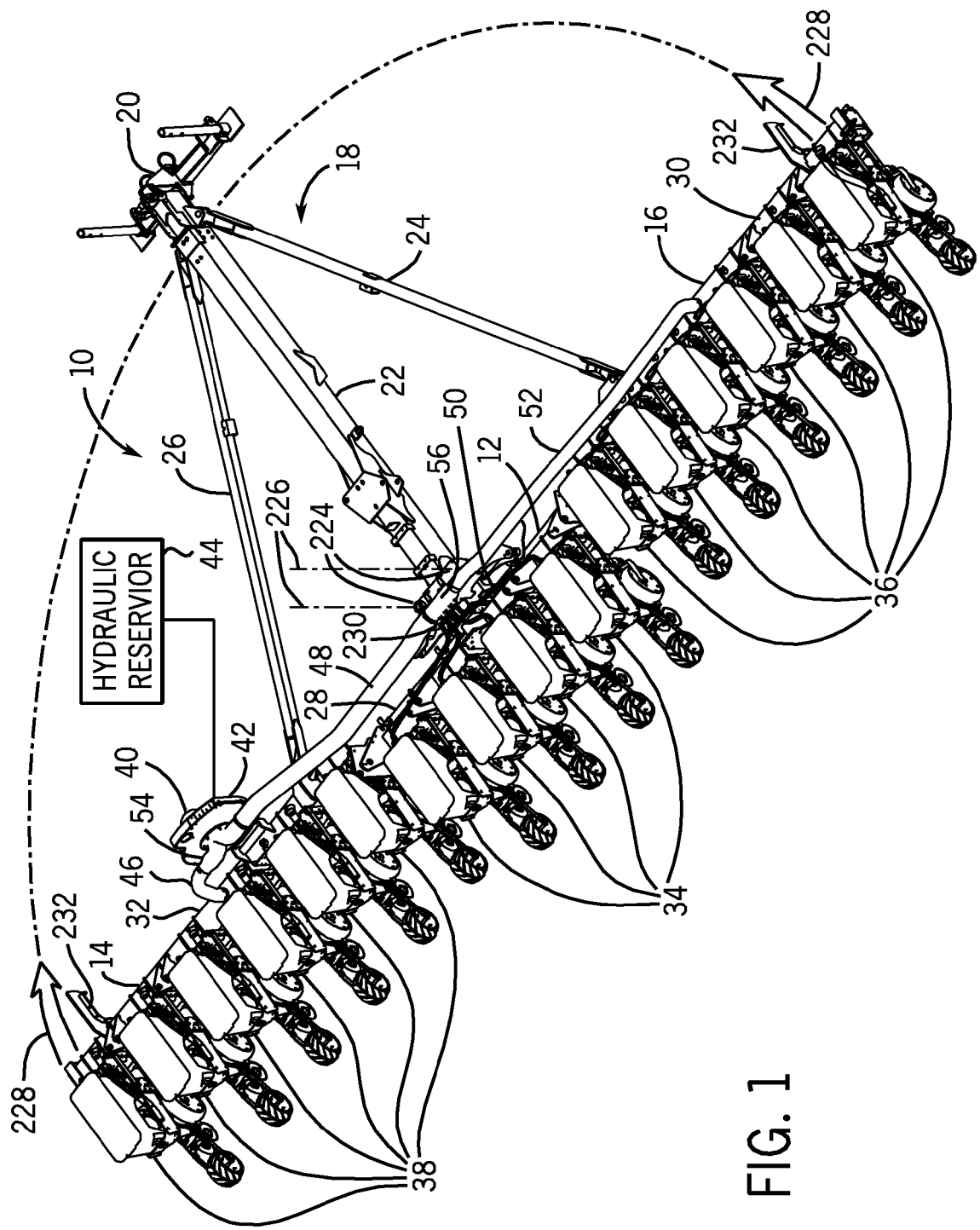
FIG. 1 is a perspective view of an exemplary agricultural seed planter in accordance with embodiments of the invention, illustrating a multiple section hollow support frame including a plurality of individual planting units and a tow frame coupled thereto.

Turning now to the drawings and referring first to FIG. 1, an embodiment of an agricultural seed planter or precision planter assembly is illustrated and designated generally by reference numeral 10. Agricultural seed planter assembly 10 includes a hollow support frame having a middle section 12, a left section 14, and a right section 16. Each section is coupled to a tow frame 18 having connection point 20 that may be coupled to a tractor or other trailer to facilitate the seeding operation. The illustrated tow frame 18 includes a center beam 22, a right section support beam, 24 and a left section support beam 26 extending between the point 20 and the sections 12, 14, and 16.

The middle section 12, left section 14, and right section 16 may include a plurality of hollow structural members that support a plurality of planting units. For example, middle section 12 may include hollow structural member 28, right section 16 may include hollow structural member 30, and left section 14 may include hollow structural member 32. The hollow structural members 28, 30, 32 may include more than one hollow metal beam mechanically coupled together to form the section. Furthermore, each hollow metal beam may have a generally rectangular cross section and include a separate hollow interior as will be discussed in more detail below. Additionally, the hollow structural members 28, 30, 32 may be made out of any suitable structural material and is not limited to metal or structural steel. For example, the structural material may be made from a composite material or durable plastic. However, one of the embodiments includes structural steel for the material of the hollow structural members 28, 30, 32. Again, these hollow structural members 28, 30, 32 are specifically designed to be load bearing members.

Middle section 12 may include a plurality of individual planting units 34, which may also be referred to as row units, planters, seed planters, or seeding assemblies. Similarly, right section 16 may include a plurality of individual planting units 36 and left section 14 may include a plurality of individual planting units 38. Specifically, the agricultural seed planter 10 illustrated in FIG. 1 is a 16 row assembly and includes 16 planting units 34, 36, 38. Other embodiments of the present invention may include a different total number of planter units (e.g., 1, 2, 4, 8, 12, 16, 20, 24, etc.) and one such embodiment that includes 24 planting units will be discussed in more detail below. Additionally, left section 14 and right section 16 are coupled to middle section 12 via a pivot (e.g., a hinge or pin-type) connection which enables the entire frame to flex and follow the terrain more evenly. This enables for precision depth control of the seeding operation for each planting unit 34, 36, 38 via the relative motion of one section to the adjacent section. The pivot connection will be discussed in more detail below.

A motor 40 and a fan or blower 42 may be mounted to any of the structural members 28, 30, 32. In the illustrated embodiment, the motor 40 and fan 42 are positioned on structural member 32 of the left section 14. Motor 40 may be a hydraulic motor coupled to a hydraulic reservoir 44 and used to drive the fan 42. An exemplary embodiment of this motor 40 is available from Eaton Hydraulics, in Eden Prairie, Minn., and may be identified by part number 74119-DAH-01. Other embodiments of motor 40 include an electric motor, a combustion engine, and so forth. Moreover, embodiments of the fan 42 may include an axial fan, a blower-type fan, a plurality of parallel fans, a plurality of sequential fans, a turbine-type fan, or a combination thereof.

A conduit system or flexible tubing system may be used to pneumatically couple the fan 42 to the hollow structural members 28, 30, and 32. For example, in the present embodiment, conduit 46 is used to couple the fan 42 to the hollow structural member 32 of the left section 14. Conduit 48 is used to couple the fan 42 to the middle section 12 and right section 16. Specifically, conduit 48 connects to junction 56, attached to the middle section 12, to enable conduit 50 to pneumatically couple planting units 34 to the fan 42. Further, conduit 52 connects to junction 56 to pneumatically couple the hollow structural member 30 of the right section to the fan 42. Additionally, multi-way coupling or tee 54 is mounted to the fan 42 to couple conduits 46 and 48 to the fan. In other embodiments, tee 54 may be completely eliminated from the assembly 10, and a single conduit may extend between the fan 42 and members 28, 30, and 32.

As will be discussed in more detail below, pneumatically coupling the fan to the hollow structural members 28, 30, and 32 enables the fan to pass a forced airflow through each hollow structural member. Further, this forced air flow may create either a pressure increase or a pressure drop (e.g., a vacuum) in the structural members 28, 30, 32 and the conduits 46, 48, 50, 52 depending on the direction of the forced air flow created by the fan 42. Embodiments of the present invention may be configured for either a pressure increase or a pressure drop in the structural member. However, one of the embodiments is configured so that the fan creates a vacuum inside structural members 28, 30, 32 and conduits 46, 48, 50, 52. Again, the members 28, 30, and 32 are configured to function as load bearing and/or structural support members and, also, function as an integral manifold. In other words, in the illustrated embodiment, all of the conduits between the fan 42 and the individual planting units 34, 36, and 38 couple to the members 28, 30, and 32, which then route the airflow between the individual planting units and the members. Although some embodiments may include supplemental manifolds or multi-way couplings, the members 28, 30, and 32 serve as the primary manifold for the assembly 10.

Figure 2:
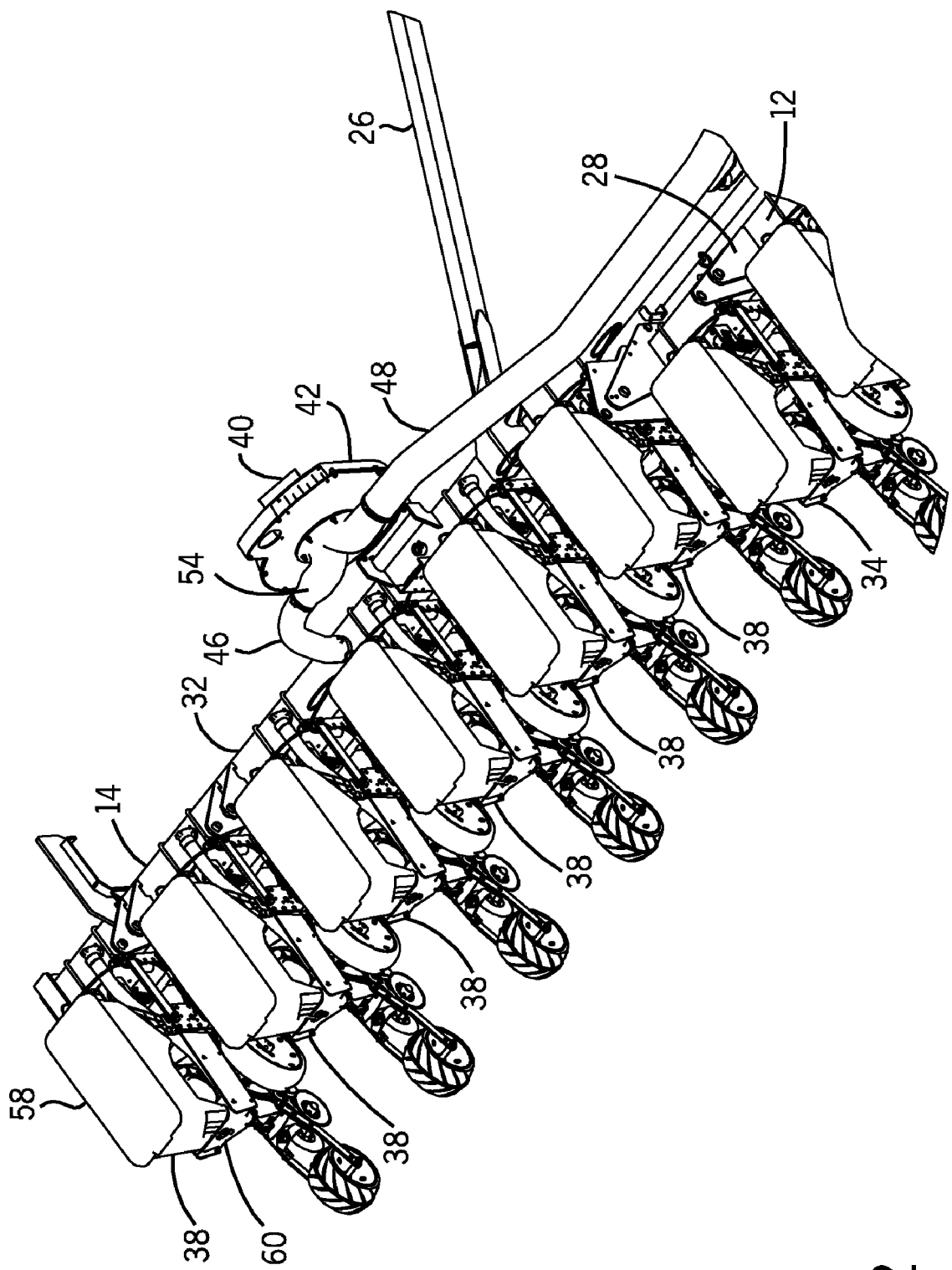
FIG. 2 is a perspective view of an embodiment of the upper left section of the agricultural seed planter of FIG. 1, illustrating a fan and multiple seed hoppers for each planting unit coupled to the hollow support frame.

FIG. 2 is a perspective view of an embodiment of the upper left section 14 of the agricultural seed planter 10 of FIG. 1, further illustrating details of the hydraulic motor 40, fan 42, conduits 46, 48 and tee 54. As discussed above, fan 42 is coupled to structural member 32 of the left section 14 via conduit 46 and tee 54. Additionally, conduit 48 couples the middle section 12 and right section 16 to the fan via tee 54. FIG. 2 further illustrates individual planting units 38 located on left section 14, as well as, one of the individual planting units 34 located on the middle section 12. Each of the planting units or row units 34, 38 each include a seed hopper 58 used to store and supply the seed for the seeding operation. Further, planting units 34, 38 are mounted to structural members 32 and 28 via a planter frame 60 discussed in more detail below.

Figure 3:
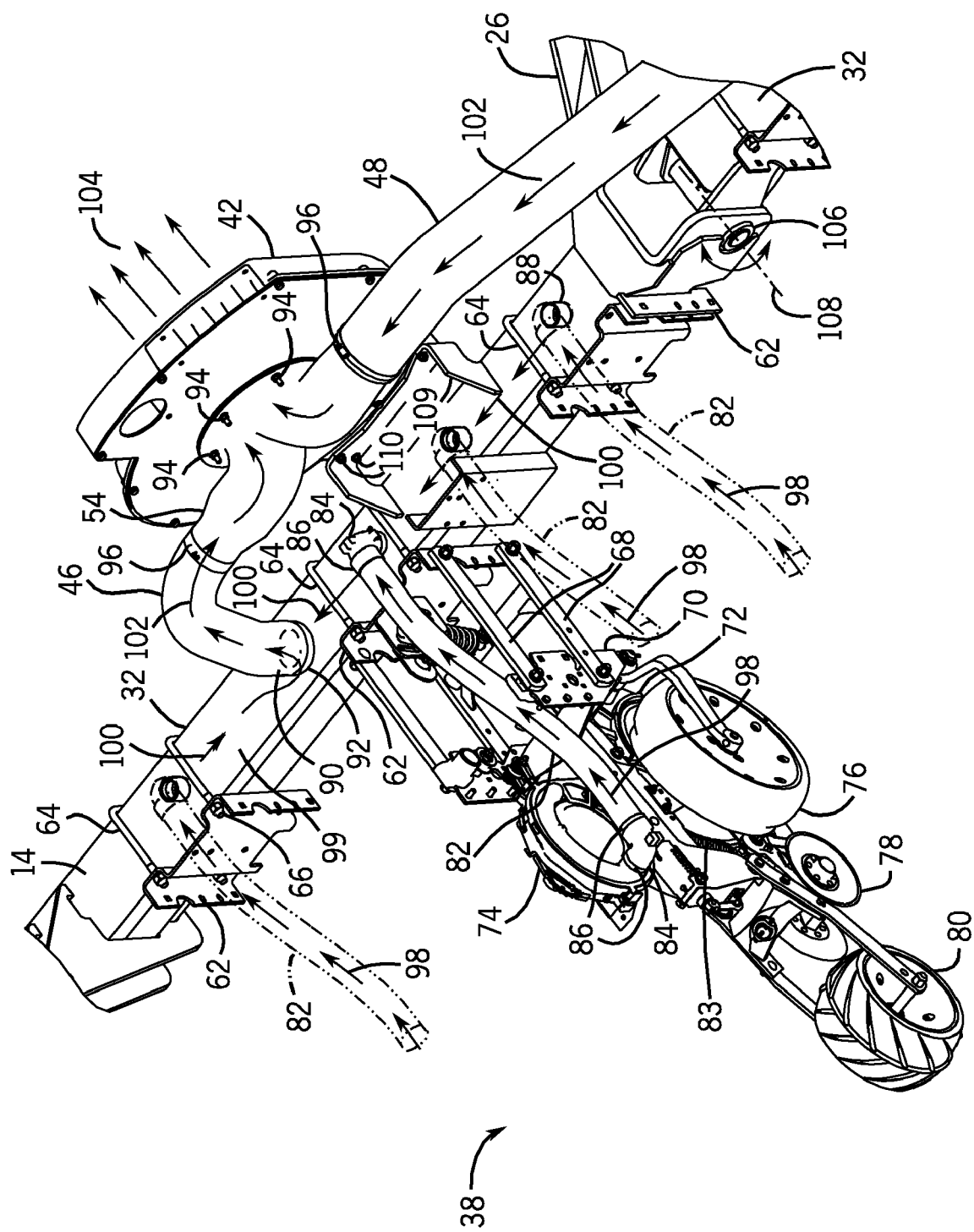
FIG. 3 is a perspective view of an embodiment of a single planting unit mounted to the hollow support frame of FIG. 2 with the seed hopper removed for clarity, further illustrating an exemplary air flow path from a planting unit to a fan.

FIG. 3 is a perspective view of an embodiment of a single planting unit 38 mounted to the hollow structural member 32 of the left section 14. The seed hopper 58 is removed for clarity. The figure illustrates the pneumatic coupling between the planting unit 38 and fan 42. Additionally, the figure illustrates one method for mounting planting unit 38 to structural member 32. A mounting bracket 62 may be used in conjunction with U-bolts 64 and nuts 66 to provide an interface between the structural member 32 and planting unit 38. Specifically, mounting bracket 62 provides mounting structures for parallel linkage 68 and support frame 70 of the planting unit 38. The mounting bracket 62 further enables the hollow structural member 32 to bear and/or distribute static and dynamic loads of the planting unit 38 and agricultural seed planter 10. Additionally, parallel linkage 68 and support frame 70 enable vertical motion of the seeding assembly in addition to any relative motion between left section 14 and middle section 12 as discussed in more detail below.

Planting unit 38 generally includes, but is not limited to, a soil opener 72, a seed meter 74, a depth wheel 76, a closing wheel or soil closer 78, and a press wheel or soil packer 80. Additionally, seed meter 74 may include either a negative pressure (e.g., vacuum) or positive pressure meter and may be coupled to a seed tube 83. Planting unit 38 may also include a number of other parts not shown, such as coulter, shanks, tillage, blades, etc.

Seed meter 74 is pneumatically coupled to vacuum fan 42 via an airflow circuit that includes the hollow structural members 28, 30, 32. Specifically, in the illustrated embodiment, seed meter 74 is coupled to hollow structural member 32 via a first conduit, flexible hose, or tube 82 and elbow couplings 84. Elbow couplings 84 are made from resilient material and are connected to the hose 82 and structural member 32 via hose clamps 86. Additionally, hollow structural member 32 may include a plurality of first ports 88 and a second port 90 to provide an air flow path through the structural member. Ports 88 and 90 may be incorporated into the hollow structural member 32 via different manufacturing processes and may include features to facilitate coupling the conduits to the ports 88, 90 of the structural members 32. For example, ports 88 and 90 may be machined and welded onto the structural member 32 to provide an upset to interface the conduits 82, 46, 48.

A plurality of ports 88 may be located along the length of each hollow structural member 28, 30, 32 at the desired planter location. FIG. 3 illustrates four ports 88 located on the length of the left section 14. Additionally, the figure illustrates a single port 90 for coupling conduit 46 to the hollow structural member 32 of the left section 14. As illustrated, ports 88 may be located at opposite ends of the structural member 32 and in varying proximity from port 90. Again, these ports 88 and 90 and the hollow interior of the members 28, 30, and 32 enable the members to function as a manifold in addition to their function as load bearing and/or support members.

As discussed, each planter 38 includes conduit 82 to pneumatically couple the seed meter 74 to the hollow structural member 32. Further, vacuum fan 42 is pneumatically coupled to the hollow structural member 32 via conduit 46. Conduit 46 may be secured to the hollow structural member 32 via hose clamp 92, and may be secured to tee 54 via hose clamp 96. Additionally, tee 54 may be secured to the fan via screws 94. In sum, each planter 38 is pneumatically coupled to fan 42 via structural member 32. Specifically, the fan 42 provides a forced airflow through the path illustrated in FIG. 3. The figure illustrates a vacuum configuration, however, the air flow path could be circulated in the opposite direction for use with a positive pressure seed meter 74.

FIG. 3 illustrates the air flow path or circuit for an exemplary section of the agricultural seed planter 10, with the other sections operating in a similar manner. Upon enabling vacuum fan 42, a pressure differential is generated within the hollow interior or passage 99 of the structural member 32 thereby creating an air flow path or circuit between the seed meter 74 and vacuum fan 42. Specifically, the first portion of the air flow path is from seed meter 74 to the structural hollow member 32, generally represented by reference numeral 98. The second portion of the air flow path is through hollow interior 99 of the structural member 32 to hose 46, generally represented by reference numeral 100. As illustrated in the figure, this portion of the flow path is a combination of multiple flow paths from each planter assemblies 38 which provides the advantage of simplifying parts of the pneumatic system.

The third portion of the air flow path is from the structural member 32 through port 90 and to the fan 42 via conduit 46, generally represented by reference numeral 102. Similarly, conduit 48 provides the air flow path from hollow structural member 28 and 30 and combines with the left section air flow path at tee 54. Vacuum fan 42 then expels the air from the pneumatic circuit, generally represented by reference numeral 104. The illustrated embodiment provides a number of advantages in that parts pneumatically coupling the vacuum fan 42 to seed meter 74 are reduced via the combined functionality of the structural members 28, 30, 32 serving both a structural supports for the individual planting units 34, 36, 38 and the fan 42, as well as, a common air flow circuit for each planting unit. Thus, the complexity of the pneumatic system is reduced and extra room is available to route other system components on the outside of the structural member, such as electrical harnesses, hydraulic hoses, etc.

Finally, FIG. 3 illustrates an embodiment of the present invention which includes a pin that enables relative motion between the multiple sections of the agricultural seed planter 10. Specifically, a pin connection or wing flex pin 106 couples two portions of the left section 14 together and enables the section to move relative to one another about axis 108. As discussed above, this enables each individual section to follow the terrain thereby enabling individual planting units 34, 36, 38 to maintain a constant seeding depth regardless of the irregularity of the terrain. Additionally, FIG. 3 illustrates the fan mounting bracket 109 and fasteners 110 used to secure fan 42 to the hollow structural member 32.

Figure 4:
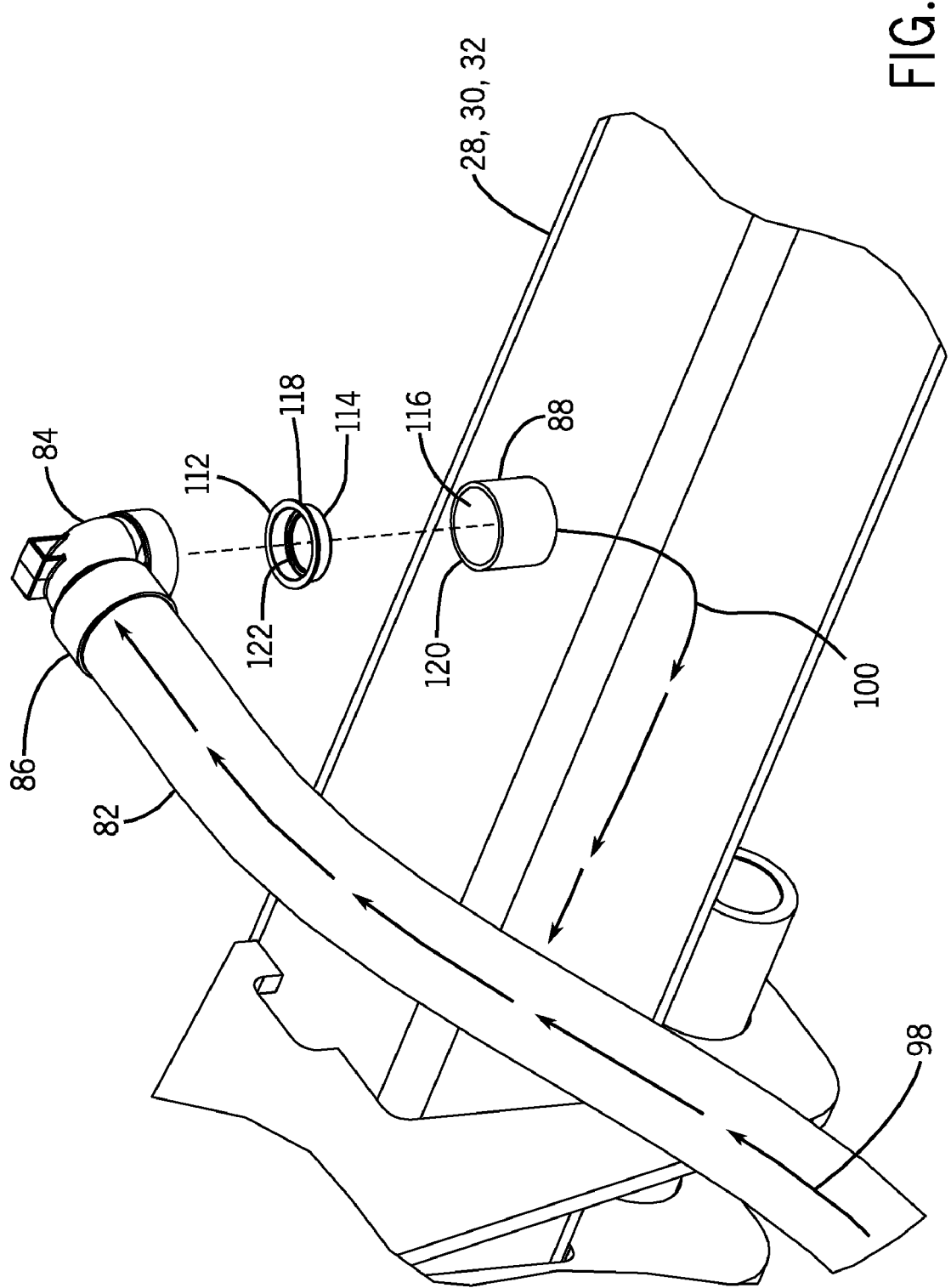
FIG. 4 is a perspective view of an embodiment of an exemplary section of the hollow structural frame of FIG. 1, illustrating an orifice that may be disposed in a port of the hollow structural frame.

FIG. 4 is a perspective view of an embodiment of an exemplary section of the hollow structural frame 28, 30, 32 and an exemplary port 88 of the previous figures. Given that each planting unit 34, 36, and 38 is located at a different proximity to the fan 42, the forced air flow or pressure differential created at each planting unit may vary depending on such proximity to the fan 42. Therefore, a restriction device or orifice may be used at each port 88 to evenly distribute the pressure differential at each planting unit. FIG. 4 illustrates one device that may be implemented in embodiments of the present invention to accomplish this goal.

Specifically, FIG. 4 illustrates an orifice 112 which includes an outside diameter 114 that is configured to interface an inside diameter 116 of port 88. Further, orifice 112 may include an upset 118 that is configured to load on shoulder 120 of port 88 to secure orifice 112 in place. Orifice 112 may include a number of different orifice restrictions 122 depending on the desired air flow rate through the port 88. As shown in the figure, airflow moves through conduit 82 and through elbow 84, generally represented by reference numeral 98, and further through orifice 112 into hollow structure member 28, 30, 32. Thus, as discussed, restriction 122 can be varied to alter the air flow through the port 88 thereby altering the pressure deferential placed on the vacuum seed meter 74. For example, in the embodiment of FIG. 1, a plurality of different orifices 112 (e.g., up to 16) may be used for the ports 88 coupled to the different individual planting units 34, 36, and 38.

Figure 5:
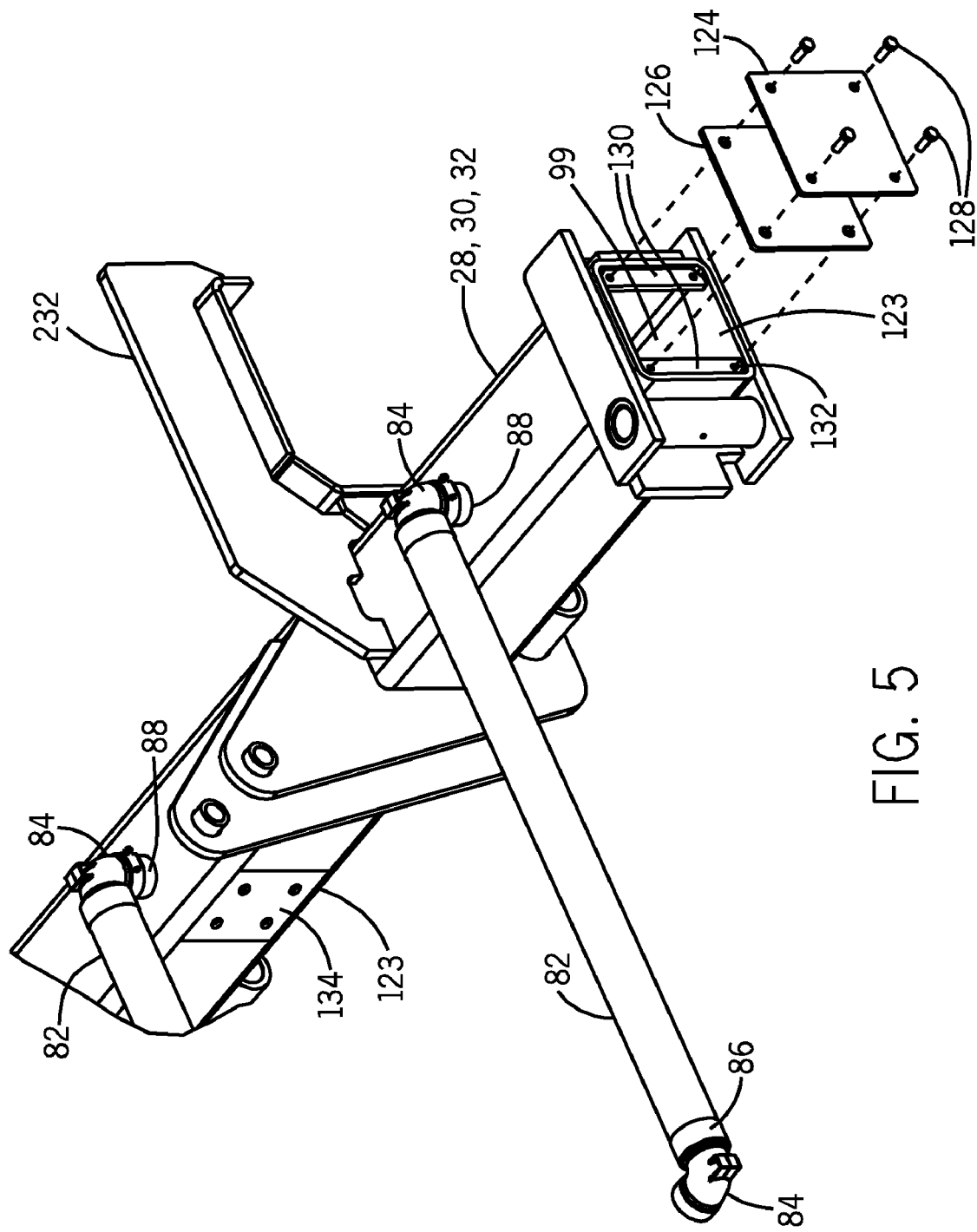
FIG. 5 is a perspective view of an embodiment of an exemplary end section of the hollow structural frame of FIG. 1, illustrating an access port and access panel to a hollow interior of the hollow structural frame.

FIG. 5 illustrates two embodiments of panels that may be implemented in hollow structural member 28, 30, 32 to enable an operator to access the hollow interior 99 of the member. Specifically, embodiments of the present invention provide access plate 124, seal 126, and fasteners 128 disposed on an end of the hollow structural member 28, 30, 32. The plate 124, seal 126, and fasteners 128 interface a sealing surface 130 and threaded holes 132 to secure the access plate 124 to the hollow structural member 28, 30, 32. Seal 126 generally prevents air flow from escaping or infiltrating the hollow interior 99 of the hollow structural member 28, 30, 32 thereby increasing pneumatic efficiency. Further, access plate 24 enables an operator to remove debris than might become trapped inside the hollow structural member 28, 30, 32. Additional access plate 134 may be incorporated along the length of the structural member 28, 30, 32 as illustrated in the figure or any other desired location.

FIG. 6 is a perspective view of an embodiment of a second exemplary agricultural seed planter 136 that illustrate a second multiple section hollow support frame configured to support a plurality of planting units. In this embodiment, the hollow support frame is configured to support 24 individual planting units. For clarity, the planter units are not illustrated in FIG. 6 but are similar to those illustrated in FIGS. 1-3 (e.g., items 34, 36, 38). Similar to the first embodiment 10, this embodiment includes a middle section 138, a left section 140, and a right section 142. Each section 138, 140, 142 is connected to a tow frame 144 having a connection point 146 to enable a tractor to tow the assembly 136. The tow frame 144 includes a center beam 148, a right section support beam 150, and left section support beam 152.

The system 136 may include multiple hollow structural members at each section 138, 140, 142. The members may include metal beams that are parallel, sequential, or combination thereof. Specifically, inner section 138 may include lower hollow structural member 156, wherein the left section 140 may include upper structural member 158 and lower structural member 160, and the right section 142 includes upper hollow structural member 162 and lower hollow structural member 164. Embodiments of the present invention may include each hollow structural member having a generally rectangular cross section. Furthermore, the upper and lower structural members may include different dimensions. For example, the upper structural members may include a cross section having a three inch height and seven inch width, whereas the lower structural member may include a cross section having a seven inch height and seven inch width.

As discussed, the individual planting units are not shown in FIG. 6, but conduits 166, 168, 170 illustrate possible locations of the planting units for each section and the relative distance between each planting unit. Specifically, conduits 166 illustrate where the individual planting units are positioned on the inner section 138. Likewise, conduits 168 and 170 illustrate where the individual planting units are positioned on the right section 142 and left section 140 respectively. Further, the illustrated embodiment includes a motor 172 and a fan 174 mounted on both the left section 140 and right section 142. As with the previous embodiment, the motor may include a hydraulic motor which is coupled to a hydraulic reservoir 176 to drive the fan 174.

FIG. 6 further illustrates a conduit system that may be used to couple the fans 174 to the seed meters via the hollow structural frame. Specifically, conduit 178 pneumatically couples a first portion of the left section 140 to the left section fan 174. Conduit 180 pneumatically couples a second portion of the left section 174 and a first portion of the middle section 138 to the left section fan 174. Likewise, conduit 182 pneumatically couples a first portion of the right section 142 to the right section fan 174. Conduit 184 pneumatically couples a second portion of the right section 174 and a second portion of the middle section 138 to the right section fan 174. Further the middle section couples to the respective left and right section at junction 188 via conduits 166 coupled to the respective structural members.

FIG. 7 is a perspective view of an embodiment of the lower right section of the agricultural seed planter of FIG. 6. As with the first embodiment, a mounting bracket 190 may be used in conjunction with U-bolts 192 and nuts 194 to provide an interface between the structural member 156, 160, 164 and the respective planting unit. The mounting bracket 190 enables the hollow structural member to bear and/or distribute static and dynamic loads of the planting unit and seed planter across each entire section 138, 140, 142.

FIG. 7 further illustrates the fan 174 and conduits 182 and 184 coupled to hollow structural frame 162 to enable one possible air flow path. Additionally, a seed meter (See FIG. 3, item 74) may be pneumatically coupled to fan 174 via an airflow circuit that includes hollow structural members 162. In the illustrated embodiment the seed meter is coupled to hollow structural member 162 via a first conduit 168 interfacing one of a plurality of first ports 198 located on the structural member 162. As with the previous embodiment, an elbow coupling 196 may be used facilitate the coupling at the ports 198. Additionally, the hollow structural member 162 may include second ports 200 to provide an air flow path to the fan 174. Ports 198, 200 may be incorporated into the hollow structural members 158, 162 via different manufacturing processes and may include features to facilitate coupling the conduits to the structural members 158, 162. For example, ports 198 and 200 may be machined and welded onto the structural member 158, 162 to provide an upset to interface the conduits 168, 182, 184.

As with the previous embodiment, a plurality of ports 198 may be located along the length of each hollow structural member 156, 158, 160, 162, 164 at the desired planter location. FIG. 6 illustrates six ports 198 located along the length of the upper hollow structural member 162 of the right section 142. Additionally, the figure illustrates two ports 200 for coupling conduit 182 and 184 to the hollow structural member 162.

As discussed with the previous embodiment, each planting unit includes conduit 166, 168, 170 to pneumatically couple a seed meter or seed tube to the hollow structural member 158, 162. Further, fan 174 is pneumatically coupled to the hollow structural member 158, 162 via conduit 178, 180, 182, 184. In sum, each planting unit is pneumatically coupled to the respective fans 174 via the respective structural member 158, 162. Specifically, the fan 174 provides a forced airflow through the path illustrated in FIG. 7. The figure illustrates a vacuum configuration, however, the air flow path could be circulated in the opposite direction for use with a positive pressure seed meter.

FIG. 7 illustrates an embodiment of an exemplary air flow path or circuit for a single section of the agricultural seed planter 136, with the other sections operating in a similar manner. Upon enabling vacuum fan 174, a pressure differential is generated within the hollow interior or passage 203 of the structural member 162 thereby creating an air flow path or circuit between a seed meter and vacuum fan 174. Specifically, the first portion of the air flow path is from the seed meter to the structural hollow member 162, generally represented by reference numeral 204. The second portion of the air flow path is through the hollow interior 203 of the structural member 162 to conduit 184, 186, generally represented by reference numeral 206. As illustrated in the figure, this portion of the flow path is a combination of multiple flow paths from the planter assemblies thereby making use of the structural member to simplify the number of parts.

The third portion of the air flow path is from the structural member 162 through port 200 and to the fan 174 via conduits 182, 184, generally represented by reference numerals 208.

Vacuum fan 174 then expels the air away from the circuit, generally represented by reference numerals 210. As before, the illustrated embodiment provides a number of advantages in that parts to pneumatically couple the vacuum fan 174 to a seed meter are drastically reduced via using the structural members 156, 158, 160, 162, 164 as both a structural support for the individual planting units, as well as, a common air flow circuit for each planter. Thus, the complexity of the pneumatic system is reduced and extra space is available to route other system components on the outside of the structural member.

Finally, FIG. 7 illustrates an embodiment of the present invention which includes a pin that enables relative motion between the different sections of the agricultural seed planter 136. Specifically, a pin connection or wing flex pin 212 couples two sections of the right section 142 together and enables relative motion about axis 212. As discussed above, this enables each individual section to follow the terrain thereby enabling the planting units located on each section to maintain a constant seeding depth regardless of the irregularity of the terrain.

FIG. 8 is a perspective view of an embodiment of the middle section of the agricultural seed planter of FIG. 6. The figure further illustrates a pin connection that enables the planter to fold from an operating position to a transport position. FIG. 6 illustrates the seed planter 136 in an operating position. To facilitate transport, embodiments of the present invention provide a folding pivot, hinge, or pin connection 216 that enable the left and right sections to rotate forward about axis 218, generally represented by reference numeral 220. Additionally, the figure illustrates the middle section interface 222 that couples conduit 166 to each hollow structural member 158, 162 respectively. Referring now to FIG. 1, the first embodiment may also include a similar folding feature by providing a folding pin or pin connection 224. The pin connection 224 enables the left and right sections to rotate forward about axis 226, generally represented by reference numeral 230. Both embodiments may also include a hanging bracket 232 that can interface center beam 22 or 148 to provide mechanical support to the left and right sections during transport.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural seed planting system, comprising:
a middle section having a middle air manifold; a right section having a right hollow support frame and a left section having a left hollow support frame; said left section and right section are coupled to said middle section;
a plurality of planting units pneumatically coupled to said left hollow support frame, said right hollow support frame and middle air manifold;
a fan pneumatically coupled to left hollow support frame; wherein said left hollow support frame, right hollow support frame and middle air manifold is configured to route air flow between the plurality of planting units and the fan, and said left support frame, right support frame and middle air manifold are configured to structurally support the plurality of planting units;
a first conduit having opposing ends; first end coupled to said fan and second end coupled to left hollow support frame;
a second conduit having opposing ends; said one end coupled to said fan and opposing end coupled to a junction on said middle air manifold;
a third conduit having opposing ends; said one end coupled to said junction and opposing end coupled at right hollow support frame;
at least one of said first, second, and third conduits being of a different diameter than the other conduits.

2. The system of claim 1, wherein the planting units comprise a seed tube, a seed meter, a seed opener or a combination thereof, pneumatically coupled to the fan via the said left support frame, right support frame and middle air manifold.

3. The system of claim 1, wherein the fan is powered by a hydraulic motor coupled to a hydraulic reservoir.

4. The system of claim 1, wherein said left hollow structure includes a plurality of first ports and a second port; said of plurality of first ports and said second port are welded on said left support frame; said left support frame is configured to pass a forced air flow between said plurality of first ports and second port to enable pneumatic operation of a feature of said agricultural seed planter system.

\* \* \* \* \*